(12) United States Patent
Al Sayeed et al.

(10) Patent No.: US 10,686,543 B1
(45) Date of Patent: Jun. 16, 2020

(54) TIME AND MARGIN CONSTRAINED ROUTING, SPECTRUM, AND RESTORATION SPEED ASSIGNMENT IN OPTICAL NETWORKS

(71) Applicant: Ciena Corporation, Hanover, MD (US)

(72) Inventors: Choudhury A. Al Sayeed, Stittsville (CA); Dave Atkinson, Ottawa (CA); Khaled Maamoun, Nepean (CA); David C. Bownass, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/292,396

(22) Filed: Mar. 5, 2019

(51) Int. Cl.
  *H04J 14/00* (2006.01)
  *H04J 14/02* (2006.01)
  *H04B 10/27* (2013.01)

(52) U.S. Cl.
  CPC ............ *H04J 14/021* (2013.01); *H04B 10/27* (2013.01); *H04J 14/0268* (2013.01)

(58) Field of Classification Search
  CPC .................................................. H04J 14/0268
  See application file for complete search history.

(56) References Cited

U.S. PATENT DOCUMENTS

| | | | |
|---|---|---|---|
| 5,442,544 A | 8/1995 | Jelinek | |
| 7,444,078 B1 | 10/2008 | Stango et al. | |
| 7,826,748 B2 | 11/2010 | Yang et al. | |
| 7,873,274 B2 | 1/2011 | Collings et al. | |
| 7,894,721 B2 | 2/2011 | Roberts et al. | |
| 7,983,560 B2 | 7/2011 | Maki et al. | |
| 8,077,384 B2 | 12/2011 | Mori | |
| 8,095,008 B2 | 1/2012 | Collings et al. | |
| 8,135,280 B2 | 3/2012 | Zong et al. | |
| 8,150,257 B1* | 4/2012 | Choudhury | H04L 41/0681 398/175 |
| 8,160,446 B2 | 4/2012 | Collings et al. | |

(Continued)

OTHER PUBLICATIONS

Aggarwal et al., A Self-Tuning Analog Proportional-Integral-Derivative (PID) Controller, 2006, IEEE, pp. 1-8.

(Continued)

*Primary Examiner* — David C Payne
*Assistant Examiner* — Pranesh K Barua
(74) *Attorney, Agent, or Firm* — Clements Bernard Walkar; Christopher L. Bernard; Lawrence A. Baratta, Jr.

(57) ABSTRACT

A controller for an optical network includes a network interface configured to communicate to one or more nodes in an optical network that includes a plurality of nodes interconnected by a plurality of links; a processor communicatively coupled to the network interface; and memory storing instructions that, when executed, cause the processor to obtain information related to a plurality of services that require spectrum assignment with each service given a time-constraint T for restoration to a restoration path and each service on its home route given a margin-constraint X dB for transients caused by restoring channels, classify each of the plurality of services in terms of viable paths in the optical network, restoration speed each viable path can tolerate, and re-tunability, and assign a home route and a restoration route, a restoration speed, and spectrum for each of the plurality of services based on priority.

20 Claims, 12 Drawing Sheets

(56) References Cited

U.S. PATENT DOCUMENTS

| | | | |
|---|---|---|---|
| 8,260,141 B2 | 9/2012 | Berg | |
| 8,364,036 B2 | 1/2013 | Boertjes et al. | |
| 9,258,190 B2 | 2/2016 | Swinkels et al. | |
| 9,276,696 B2 | 3/2016 | Al Sayeed et al. | |
| 9,344,191 B2 | 5/2016 | Al Sayeed et al. | |
| 9,806,803 B2 | 10/2017 | Bownass et al. | |
| 9,831,947 B2 | 11/2017 | Boertjes | |
| 9,853,762 B2 | 12/2017 | Evans et al. | |
| 10,298,356 B1* | 5/2019 | Chatelain | H04J 14/0241 |
| 2002/0191241 A1 | 12/2002 | Emery et al. | |
| 2003/0058497 A1 | 3/2003 | Park et al. | |
| 2006/0018658 A1 | 1/2006 | Mori | |
| 2006/0024057 A1* | 2/2006 | Kilper | H04B 10/296 398/69 |
| 2007/0014571 A1 | 1/2007 | Roberts et al. | |
| 2007/0172237 A1* | 7/2007 | Risbood | H04J 14/0227 398/59 |
| 2007/0269215 A1 | 11/2007 | Sugaya | |
| 2008/0285973 A1 | 11/2008 | Uchiyama et al. | |
| 2009/0116837 A1 | 5/2009 | Boertjes et al. | |
| 2010/0091355 A1 | 4/2010 | Ota | |
| 2010/0104276 A1 | 4/2010 | Komaki | |
| 2010/0189441 A1* | 7/2010 | Bolla | H04J 14/021 398/79 |
| 2010/0202777 A1 | 8/2010 | Liu et al. | |
| 2010/0221004 A1 | 9/2010 | Haslam et al. | |
| 2011/0176802 A1 | 7/2011 | Callan | |
| 2011/0200324 A1 | 8/2011 | Boertjes et al. | |
| 2011/0222846 A1 | 9/2011 | Boertjes et al. | |
| 2011/0222851 A1 | 9/2011 | Berg | |
| 2011/0222862 A1 | 9/2011 | Boertjes et al. | |
| 2011/0268442 A1 | 11/2011 | Boertjes et al. | |
| 2011/0274425 A1 | 11/2011 | Grobe | |
| 2013/0129350 A1* | 5/2013 | Koley | H04L 41/5022 398/45 |
| 2013/0209091 A1* | 8/2013 | Mateosky | H04B 10/07953 398/26 |
| 2015/0117858 A1 | 4/2015 | Al Sayeed et al. | |
| 2015/0229404 A1 | 8/2015 | Boertjes et al. | |
| 2015/0229528 A1* | 8/2015 | Swinkels | H04L 41/0896 398/45 |
| 2015/0333824 A1 | 11/2015 | Swinkels et al. | |
| 2015/0333862 A1 | 11/2015 | Swinkels et al. | |
| 2015/0333864 A1 | 11/2015 | Swinkels et al. | |
| 2016/0036520 A1* | 2/2016 | Swinkels | H04L 45/22 398/1 |
| 2016/0050470 A1* | 2/2016 | Swinkels | H04Q 11/0062 398/45 |
| 2016/0182146 A1* | 6/2016 | Schmidtke | H04B 10/038 398/2 |
| 2016/0182982 A1* | 6/2016 | Schmidtke | H04L 45/38 398/51 |
| 2017/0085316 A1* | 3/2017 | Al Sayeed | H04B 10/03 |
| 2017/0142505 A1* | 5/2017 | Maamoun | H04Q 11/0066 |
| 2017/0223436 A1* | 8/2017 | Moynihan | H04Q 11/0003 |

OTHER PUBLICATIONS

PID Theory Explained, Mar. 29, 2011, pp. 1-4.

ITU-T, Telecommunication Standardization Sector of ITU, G.694.1, Spectral grids for WDM applications: DWDM frequency grid, Feb. 2012, pp. 1-16.

ITU-T, Telecommunication Standardization Sector of ITU, G.698.2, Amplified multichannel dense wavelength division multiplexing applications with single channel optical interfaces, Nov. 2009, pp. 1-38.

* cited by examiner

TIME AND MARGIN CONSTRAINED ROUTING, SPECTRUM, AND RESTORATION SPEED ASSIGNMENT IN OPTICAL NETWORKS

FIELD OF THE DISCLOSURE

The present disclosure generally relates to optical networking. More particularly, the present disclosure relates to systems and methods for time and margin constrained routing, spectrum, and restoration speed assignment in optical networks.

BACKGROUND OF THE DISCLOSURE

Timing is critically important for restoration or channel additions in an optical network. For example, following a fiber cut, achieving layer 0 (optical) restoration within a short given time is critical to network operators and customers. If services can be restored within a short time (e.g., <=1 min), that means higher layer routers and their switch ports can be made available for carrying more traffic instead of reserving them for protection. Commonly-assigned U.S. Pat. No. 10,050,737, issued Aug. 14, 2018, and entitled "Methods and apparatus for pre-programming layer-0 service turn up speeds for photonic service provisioning or restoration," the contents of which are incorporated herein, describes pre-programming restoration speeds for a given path.

Knowing future traffic demands, pre-planning for restoration to see if that layer 0 restoration can always be achieved within a short and strict time-limit such as 10 s, 60 s, etc. is a multi-dimensional problem. There is a need to know viable routes available for both home and restoration. Pre-selecting home-route based on latency, k-shortest path, diversity is not good enough, as equal priorities need to be assigned for selecting restoration paths due to the time-constraint restoration aspects. Link budget penalties have the biggest impact when selecting faster restoration speeds as the existing in-service channels on a restoration path will need to survive transients momentarily due to faster restoration activity. Hence, there is a need for additional margin requirement for pre-existing channels on a restoration path to allow fast restoration activity to meet the given time-constraint. In order to limit the link budget exposure, specific network engineering is required for any network based on the demands' capacity and reach. Such network engineering may include balancing the loads with specific spectrum assignment between home and restoration routes.

Hence, the challenge becomes, knowing future traffic demands, how the home and restoration routes can be selected, along with spectrum assignments for those demands so that a guaranteed time-constrained restoration can be achieved for any fiber cuts on the home route without costing too much additional link budget penalty on existing traffic.

There is no conventional approach for 1) a time-constrained Routing and Spectrum Assignment (RSA) for layer 0, i.e., how to restore or add channels within a fixed given time, 2) margin penalty-constrained RSA, i.e., to ensure existing channels on a restoration path do not experience more than a given penalty due to fast transients of a restoration activity, and 3) pre-planning of restoration speeds per route or per service to guarantee the time-constraint.

BRIEF SUMMARY OF THE DISCLOSURE

In an embodiment, a controller for an optical network includes a network interface configured to communicate to one or more nodes in an optical network that includes a plurality of nodes interconnected by a plurality of links; a processor communicatively coupled to the network interface; and memory storing instructions that, when executed, cause the processor to obtain information related to a plurality of services that require spectrum assignment with each service given a time-constraint T for restoration to a restoration path and each service on its home route given a margin-constraint X dB to tolerate transients caused by restoring channels, classify each of the plurality of services in terms of viable paths in the optical network, restoration speed each viable path can tolerate, and re-tunability, and assign a home route and a restoration route, a restoration speed, and spectrum for each of the plurality of services based on priority. The memory storing instructions that, when executed, can further cause the processor to assign the restoration route for a service to meet the time-constraint T and the margin-constraint X dB before selecting the home route. The restoration speed can be determined based on a combination of distance of a restoration path, restoration mode achievable by the controller based on the margin-constraint X dB of any existing in-service channels on the restoration path, and amplifier types on the restoration path.

The assigned spectrum can utilize an interleaving format where initial placement is on a middle portion of optical spectrum outward. A service can be configured to re-tune to a reserved portion of the interleaving format on the restoration route, and wherein the service selects a closest reserved portion to the middle portion. The re-tunability can include whether a node associated with a service can achieve the time-constraint $T \geq T_P + T_R$, where $T_P$=photonic switching time, and $T_R$=modem retune time. A set of services of the plurality of services can have the same source and destination in the optical network, wherein there are two or more maximally diverse paths between the source and destination, and wherein the set of services are assigned in a balanced manner between the two or more maximally diverse paths. The two or more maximally diverse paths can be assigned spectrum in an interleaved manner such that one path has even interleaving, and another path has odd interleaving, each having reserved slots that are used for restoration from the other path. The memory storing instructions that, when executed, can further cause the processor to obtain customer-defined policies for the time-constraint T for restoration relative to regeneration or existing in-service traffic integrity, and utilize the customer-defined policies for classification and assignment.

In another embodiment, a method includes, for an optical network having a plurality of nodes interconnected by a plurality of links, obtaining information related to a plurality of services that require spectrum assignment with each service given a time-constraint T for restoration to a restoration path and each service on its home route given a margin-constraint X dB for transients caused by restoring channels; classifying each of the plurality of services in terms of viable paths in the optical network, restoration speed each viable path can tolerate, and re-tunability; and assigning a home route and a restoration route, a restoration speed, and spectrum for each of the plurality of services based on priority. The method can further include assigning the restoration route for a service to meet the time-constraint T and the margin-constraint X dB before selecting the home route. The restoration speed can be determined based on a combination of distance of a restoration path, restoration mode achievable by the controller based on the margin-constraint X dB of any existing in-service channels on the restoration path, and amplifier types on the restoration path.

The assigned spectrum can utilize an interleaving format where initial placement is on a middle portion of optical spectrum outward. A service can be configured to re-tune to a reserved portion of the interleaving format on the restoration route, and wherein the service selects a closest reserved portion to the middle portion. The re-tunability can include whether a node associated with a service can achieve the time-constraint $T \geq T_p + T_R$, where $T_p$=photonic switching time, and $T_R$=modem retune time. A set of services of the plurality of services can have the same source and destination in the optical network, wherein there are two or more maximally diverse paths between the source and destination, and wherein the set of services are assigned in a balanced manner between the two or more maximally diverse paths. The method can further include obtaining customer-defined policies for the time-constraint T for restoration relative to regeneration or existing in-service traffic integrity; and utilizing the customer-defined policies for classification and assignment.

In a further embodiment, a non-transitory computer-readable medium includes instructions that, when executed, cause a processor to perform the steps of, for an optical network having a plurality of nodes interconnected by a plurality of links, obtaining information related to a plurality of services that require spectrum assignment with each service given a time-constraint T for restoration to a restoration path and each service on its home route given a margin-constraint X dB for transients caused by restoring channels; classifying each of the plurality of services in terms of viable paths in the optical network, restoration speed each viable path can tolerate, and re-tunability; and assigning a home route and a restoration route, a restoration speed, and spectrum for each of the plurality of services based on priority. The instructions that, when executed, can further cause the processor to perform the step of assigning the restoration route for a service to meet the time-constraint T and the margin-constraint X dB before selecting the home route. The instructions that, when executed, can further cause the processor to perform the step of reducing capacity for a given photonic service if the service fails to have X dB additional SNR margin on its home route to survive fast restoration activity.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for time and margin constrained routing, spectrum, and restoration speed assignment in optical networks. In this disclosure, a routing, spectrum, and restoration speed assignment technique is presented that can achieve layer 0 restoration or channel adds within a given time-constraint, as well as, can keep margin penalties on the pre-existing channels on the restoration path within a given maximum penalty constraint. The systems and methods add time-constrained concepts to layer 0 restoration, or channel adds for path selection and spectrum assignment. The systems and methods also include the concept of finding restoration paths with a margin penalty constraint in addition to the time constraint. Here, spectrum assignment is performed paying attention to multi-dimensional factors, including a) transient tolerance of the restoration paths, b) re-tuning tolerance of the achievable speed on the restoration paths, and c) spectrum availability in both home and restoration paths. The criteria for selecting a home route is different. Traditionally, home routes are picked considering K-shortest path algorithms. In the systems and methods, priority is giving on selecting the restoration path first from the list of viable routes to meet time and margin penalty constraints, and then selecting the home route that may not have those constraints in the same priority as the restoration.

Knowing demands in advance and pre-planning the restoration speed to guarantee a fast layer 0 recovery is a complex problem with multi-dimensional dependency (spectral loading, margin availability, power transient tolerance, appropriate restoration speed settings, retune at restoration and so on). The systems and methods abstract these physical layer complexities into rules or hypothesis that can be used to derive RSA solutions that can respect time-constrained restoration as well as maintaining all the physical limitations.

Example Optical Network

Figure 1:
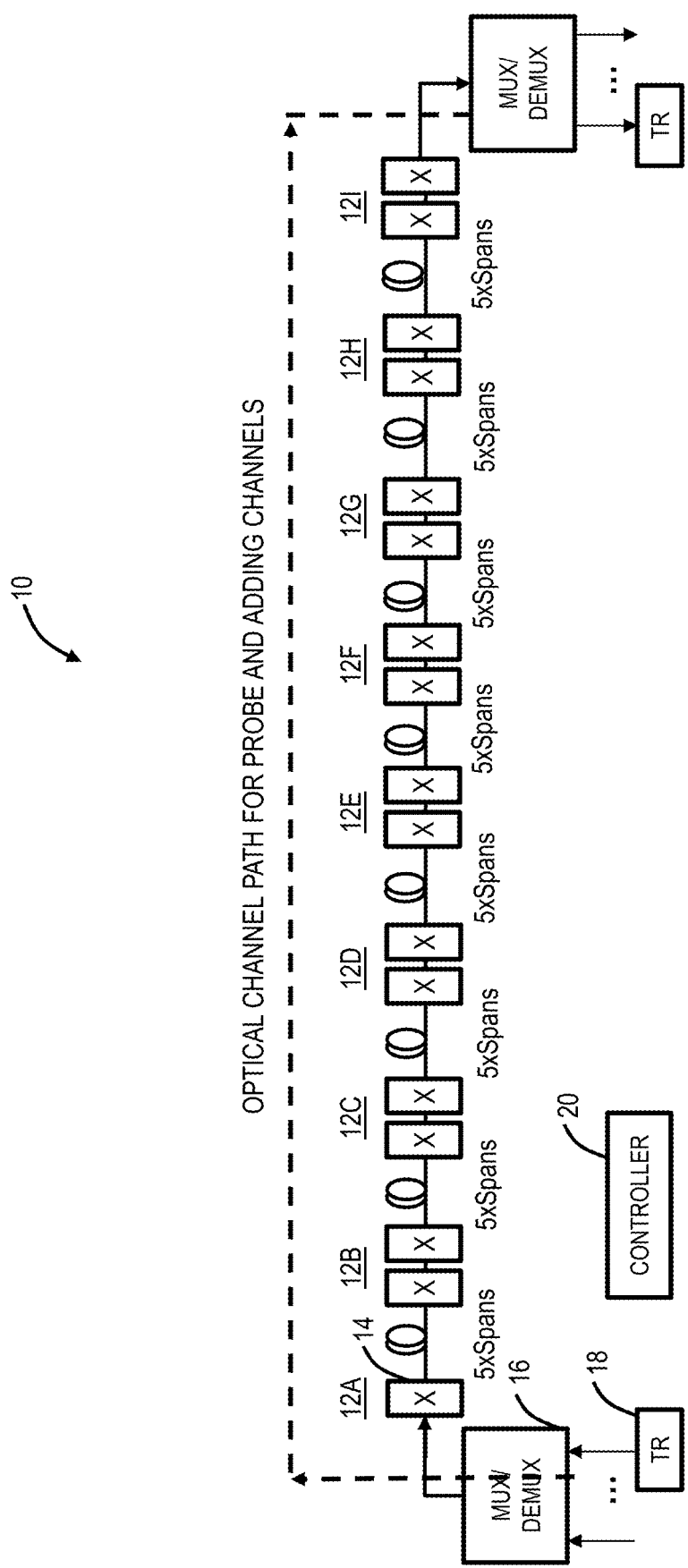
FIG. 1 is a network diagram of an example optical network including various Optical Add/Drop Multiplexer (OADM) nodes.

FIG. 1 is a network diagram of an example optical network 10 including various Optical Add/Drop Multiplexer (OADM) nodes 12. This example includes 9 OADM nodes 12, labeled OADM nodes 12A-12I in a linear configuration. Those skilled in the art recognize other network architectures are possible and contemplated by the systems and methods, such as mesh, ring, hub and spoke, and the like. The OADM nodes 12 include Wavelength Selective Switches (WSS) 14 or some other spectrum selective component used to form a degree facing the network 10, multiplexer/demultiplexer components 16, and optical modems 18. There are various other components known to those of ordinary skill in the art which are omitted for illustration purposes. For example, other components can include optical amplifiers including Erbium-Doped Fiber Amplifiers (EDFAs), Raman amplifiers, etc., Optical Channel Monitors (OCMs), optical controllers, Variable Optical Attenuators (VOAs), etc.

In the example of FIG. 1, the optical network 10 includes 40 spans with 5 spans between each OADM node 12. This means there are intermediate optical line amplifiers (not shown) in the network 10, e.g., for 5 spans, there are 4 intermediate optical line amplifier nodes between each OADM node 12, incorporating a total of 6 intermediate optical line amplifiers. There can be various different configurations of the spans and the optical amplifiers. For example, in a first configuration, the spacing between nodes (i.e., between the OADM nodes 12 and the intermediate optical line amplifiers, and between the intermediate optical line amplifiers themselves) can be 80 km per span, and they can be only EDFA amplifiers per span. In a second configuration, the spacing can be 80 km per span with EDFA amplifiers and Raman amplifiers per span. In a third configuration, the spacing can be 120 km per span with EDFA amplifiers and Raman amplifiers per span. It is possible to have spans with mixed configurations as well, where some spans are only EDFA amplified, where some spans contain both EDFA and Raman amplifiers. Each of these configurations can utilize Non-Dispersion Shifted Fiber (NDSF) type, or any other fiber types. Of course, other configurations are contemplated with these example configurations utilized herein for simulation results.

A controller 20 can be communicatively coupled to the OADM nodes 12 and the intermediate optical line amplifiers. In an embodiment, the controller 20 can be "in-skin" where it is part of one or more of the OADM nodes 12, i.e., a module contained therein. In another embodiment, the controller 20 can be an external device that is in communication with the various nodes. In either embodiment, the controller 20 is generally a processing device that obtains inputs from the optical network 10 and provides outputs for configuring the optical network 10. The controller 20 can perform control algorithm/loop for managing wavelengths/spectrum from a physical perspective at Layer 0. In one aspect, the controller 20 is configured to add/remove wavelengths/spectrum from the spans in a controlled manner to minimize impacts to existing, in-service, traffic-carrying channels. For example, the controller 20 can adjust modem launch powers, optical amplifier gain, Variable Optical Attenuator (VOA) settings, WSS parameters, etc.

Figure 2:
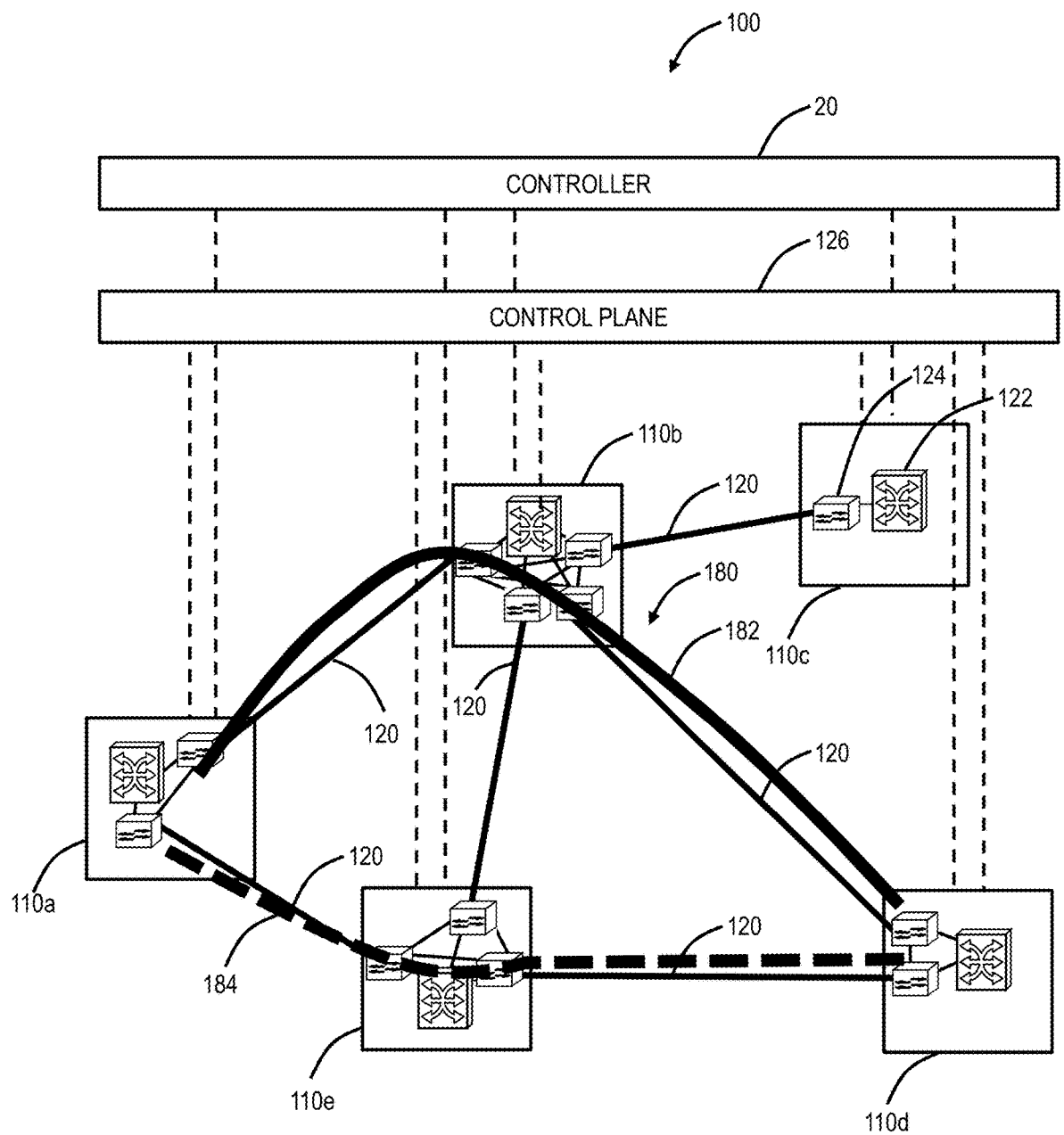
FIG. 2 is a network diagram of an example mesh optical network with five interconnected sites.

FIG. 2 is a network diagram of an example mesh optical network 100 with five interconnected sites 110a, 110b, 110c, 110d, 110e. The sites 110 are interconnected by a plurality of links 120. Each of the sites 110 can include a switch 122 and one or more Wavelength Division Multiplexed (WDM) network elements 124. The switch 122 is configured to provide services at Layer 0 (DWDM, photonic), Layer 1 (e.g., Optical Transport Network (OTN)), and/or Layer 2 (e.g., Ethernet). The WDM network elements 124 provide the photonic layer (i.e., Layer 0) and various functionality associated therewith (e.g., multiplexing, amplification, optical routing, wavelength conversion/regeneration, local add/drop, etc.) including photonic control via the controller 20. Of note, while shown separately, those of ordinary skill in the art would understand the switch 122 and the WDM network elements 124 may be realized in the same network element or each in multiple network elements. The photonic layer can also include intermediate amplifiers and/or regenerators on the links 120 which are omitted for illustration purposes. The optical network 100 is illustrated, for example, as an interconnected mesh network, and those of ordinary skill in the art will recognize the optical network 100 can include other architectures, with additional sites 110 or with fewer sites 110, with additional network elements and hardware, etc. The optical network 100 is presented herein as an example of implementing the systems and methods.

The sites 110 communicate with one another optically over the links 120. The sites 110 can be network elements which include a plurality of ingress and egress ports forming the links 120. Further, the sites 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes 130 at each particular node 130. As described herein, the terms node and network element are interchangeable, each representing a device in the network 100. The network 100 includes a control plane 126 operating on and/or between the switches 122 and/or the WDM network elements 124 at the sites 110a, 110b, 110c, 110d, 110e. The control plane 126 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an embodiment, the control plane 126 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 126 can utilize any type control plane for controlling the switches 122 and/or the WDM network elements 124 and establishing connections.

For illustration purposes, the network 100 includes a mesh-restorable service 180 with a home route 182 and a restoration route 184. As is described herein, the systems and methods focus on providing the restoration route 184 such that the mesh-restorable service 180 can be rerouted from the home route 182 to the restoration route 184 within a time constraint T and with a margin constraint of X dB for the existing in-service channels on the restoration route 184. One unique aspect of this approach is to focus first on selecting the restoration route 184 and then selecting the home route 182.

Different Restoration Speeds

The controller 20 can operate in different modes that are characterized by having different restoration speed settings. For example, a first mode can have performance optimized controller ramps, a second mode can have sequenced photonic switching, and a third mode can have parallel photonic switching. The first mode generally takes the longest, is a default approach for any mesh restoration, scales sub-linearly based on the number of sections, and can work with stringent link budget constraints in long haul networks. The first mode has no additional link budget penalties, no other network engineering constraints, and supports optical modem's maximum reach.

The second mode can be utilized where a network is engineered with additional Net System Margin (NSM). Note, even in a "critically" designed network, it is normal to have excess margin since the network is designed for full-fill, end of life, fixed modulation formats, with a safety margin (user defined with such things as fiber repair and ageing, etc.), etc. (i.e., forecast tolerant). Of note, most of a network's life is spent in a condition which has fewer impairments over certain period of expected end of life (EOL) term. Therefore, there is extra margin in most operating conditions and this extra margin can be characterized as the NSM. The NSM can be expressed in dB/SNR and provide a view of how much more noise can be handled until the Forward Error Correction (FEC) limit is reached. The second mode includes network engineering related to specific spectral assignment and load distribution to reduce restoration impact on the NSM. The second mode scales linearly with the number of sections. For example, the second mode can require an additional ~2 dB Signal-to-Noise Ratio (SNR) margin over long haul networks.

The third mode can be utilized in smaller, i.e., metro networks, with mesh channels. The third mode can also be utilized in long haul network if there is NSM engineering therein, e.g., ~2 dB additional SNR margin. Here, the restoration path actuators are set completely in parallel based on pre-estimated channel power values with no controlled ramp to provide uniform restoration times regardless of the number of nodes, spans, or sections in a path.

Generally, the distinction between the different modes is a trade-off between speed and transient impact on existing in-service channels. That is, the first mode has the slowest speed, but the least impact on existing in-service channels. The other modes provide a trade-off is faster speed to restore channels at the expense of transient impacts on the existing in-service channels. It is possible to take advantage of this trade-off when there is sufficient margin for the existing in-service channels. Also, these modes refer to control loops performed by the controller 20.

The restoration speeds of these modes are as follows:

| Mode | Restoration speed for capacity adds |
| --- | --- |
| Mode 1 | ~20 s per optical section |
| Mode 2 | ~4 s per optical section |
| Mode 3 | ~10 s irrespective of the number of optical sections |

Time- and Margin-Constrained Routing, Spectrum, and Restoration Speed Assignment Variously, the systems and methods leverage the above controller modes to provide time-constrained concepts for layer 0 restoration (for path selection and spectrum assignment). The systems and methods can find restoration paths with a margin penalty-constraint in addition to the time constraint. Existing RSA algorithms deal with a margin for selecting home routes (i.e., the working route, the main route, etc.). The systems and methods consider a maximum margin penalty for selecting restoration speeds for different restoration routes. Traditionally, spectrum assignment deals with assigning spectrum to meet the requirements for home-route only. In the systems and methods described herein, spectrum assignment needs to pay equal attention to multi-dimensional factors, including a) transient tolerance of the restoration paths, b) re-tuning tolerance of the achievable speed on the restoration paths, and c) spectrum availability in both home and restoration paths.

The systems and methods adjust the criteria for selecting a home route. Again, home routes are traditionally picked considering K-shortest path algorithms. In the systems and methods described herein, priority is given on selecting the restoration path first from a list of viable routes to meet time- and margin penalty-constraints, and then selecting the home route that may not have those constraints in the same priority as the restoration. That is, the home route does not need to have time-constraints because, at initial turn-up, this is less important. Whereas while operational and being switch to a restoration route is time critical.

Again, knowing demands in advance and pre-planning the restoration speed to guarantee a fast layer 0 recovery is a complex problem with multi-dimensional dependency (spectral loading, margin availability, power transient tolerance, appropriate restoration speed settings, retune at restoration and so on). The systems and methods abstract those physical layer complexities into simple rules or hypothesis that can be used to derive heuristics for RSA solutions to respect time-constrained restoration as well as maintaining all other physical limitations.

The systems and methods have two constraints—a time constraint and a margin penalty constraint. For the time constraint, on a fiber cut or other failure, any mesh-restorable channel needs to be restored within time T, where T=60 s, 10 s, or some other time value.

For the margin penalty constraint, restoration activity on any path cannot cost more than X dB of additional SNR margin penalty (e.g., where X=2 dB) on top of End of Life (EOL) SNR margin for any existing channels on that path. The margin penalty constraint equals X dB+EOL SNR margin. Note, this is a transient restoration margin penalty constrain for already existing channels on the restoration path enabling the existing channels to survive power transients due to restoration activity, and not necessarily a margin constraint for channels on their home route. Also, any link budget penalty budgets such as Polarization Dependent Loss (PDL), control errors, some of fiber repair margins, etc. can be excluded from the EOL SNR margin value to handle the restoration margin allocation which is more of a transient impact and not permanent offset. That is, these link budget penalties are needs over a long time period while restoration is much shorter. Instead of considering the EOL margin, it is also possible to consider Beginning of Life (BOL) margin to allocate additional X dB transient margins for restorations. However, in such case, the available margin needs to be periodically monitored with system condition changes to ensure the pre-allocated X dB margin is still available on the path to consider for fast restoration activities.

The following are simple rules or hypothesis that can be used to derive heuristics for the systems and methods.

Hypothesis (1): channels on any route to be placed in an interleaving format starting from the middle part of the spectrum and then expanding towards high and low-frequency edges (Spectrum Assignment (SA)). If the restoration channels take the interleaved spaces and start filling up the spectrum from the middle at time-constrained restoration speeds, then the margin penalty on existing channels will remain within the given constraint, X=2 dB, 0.5 dB, etc. For example, the spectrum can be the C-band which is, e.g., about 1528 nm to 1565 nm. Interleaving means the channels are located with empty spectrum between each channel where the empty spectrum is available for another channel, i.e., a restoration channel. Here, the interleaving spaces between channels do not have to be equal and can contain plurality of restoration channels in between.

Hypothesis (2): channels to be placed can be an individual photonic service (i.e., an optical signal), or a group of services placed contiguously in the spectrum (e.g., a Media Channel (MC), Super channel, etc.). The key is to start channel placement from the middle in interleaving format (hypothesis #1), and the exact channel bandwidth is irrelevant. The interleaving should be based on the amount of spectrum for the channels.

Hypothesis (3): the interleaved spaces to be left in the best effort for future traffic placement that consists of restoration traffic as well as home-route traffic. The interleaved space is for first come first served and not reserved for any dedicated traffic (i.e., not 1+1 protection).

Hypothesis (4): distribute demands in a balanced format over multiple home routes instead of congesting a single route.

Hypothesis (5): if the restoration path is ≤$d_1$ (e.g., —1700 km), then they can be restored using a mode that provides restoration time irrespective of span or ROADM counts (such as mode 3). With such modes in place, channels can be re-tuned (change the spectrum of the modem 18) if necessary and still can achieve the time-constraint if T≥$T_p$+$T_R$, where $T_p$=photonic switching time, and $T_R$=modem retune time. This means, when getting restored to a path with condition T≥$T_p$+$T_R$, take spectral spaces in the middle in interleaving format if available even if that requires a frequency retune.

Hypothesis (6): if the restoration path includes Raman amplifiers (e.g., for every span ≥~80 km), then up to $d_2$ (e.g., ~3600 km) distance, a restoration mode that provides restoration time irrespective of span or ROADM counts (such as mode 3) can be assigned, provided that at restoration, new channels will be taking spectral spaces in the middle in the interleaving format if available even if that requires a frequency retune.

Hypothesis (7): if the restoration path is ≤$d_3$ (e.g., ~2600 km), but >$d_1$ && does not contain that many Raman amplified spans, then they can be restored using a mode that requires some level of fast controller actions in every optical section (such as mode 2). With such modes in place, a retuning may exceed the total time constraint, T, since in this case, $T_p$ will be hop dependent with a fixed $T_R$. Spectral slots need to be reserved for routes in interleaving format if T<($T_p$+$T_R$). In other words, if the viable restoration route meets the condition for T<($T_p$+$T_R$), then spectral slots need to be selected for demand such that it is available for both home and restoration routes and assigned following Hypothesis #1 to limit margin impacts.

Hypothesis (8): It is possible achieve further distances than what is recommended by distance $d_3$ using one of the fast restoration modes such as mode 2 or mode 3 for restoring limited capacities in interleaving format in a balanced loaded system following a single fiber cut. Such distance is identified by distance $d_4$. For example, in an EDFA+Raman amplified system, with interleaving spectral assignment, approximately 60% of pre-existing capacities can be restored using mode 3 up to a distance $d_4$ (~4800 km) without costing a margin penalty more than X=2 dB. That is, if the restoration path already contains 32× channels in an interleaving format, another ~20× channels can be restored on that path using interleaved spaces using mode 3.

Hypothesis (9): if the margin penalty constraint cannot be met, then leave the restoration to a performance-optimized mode (such as mode 1), and allow re-tune at restoration if necessary, to take available spectral spaces in the middle of the restoration path.

Figure 3:
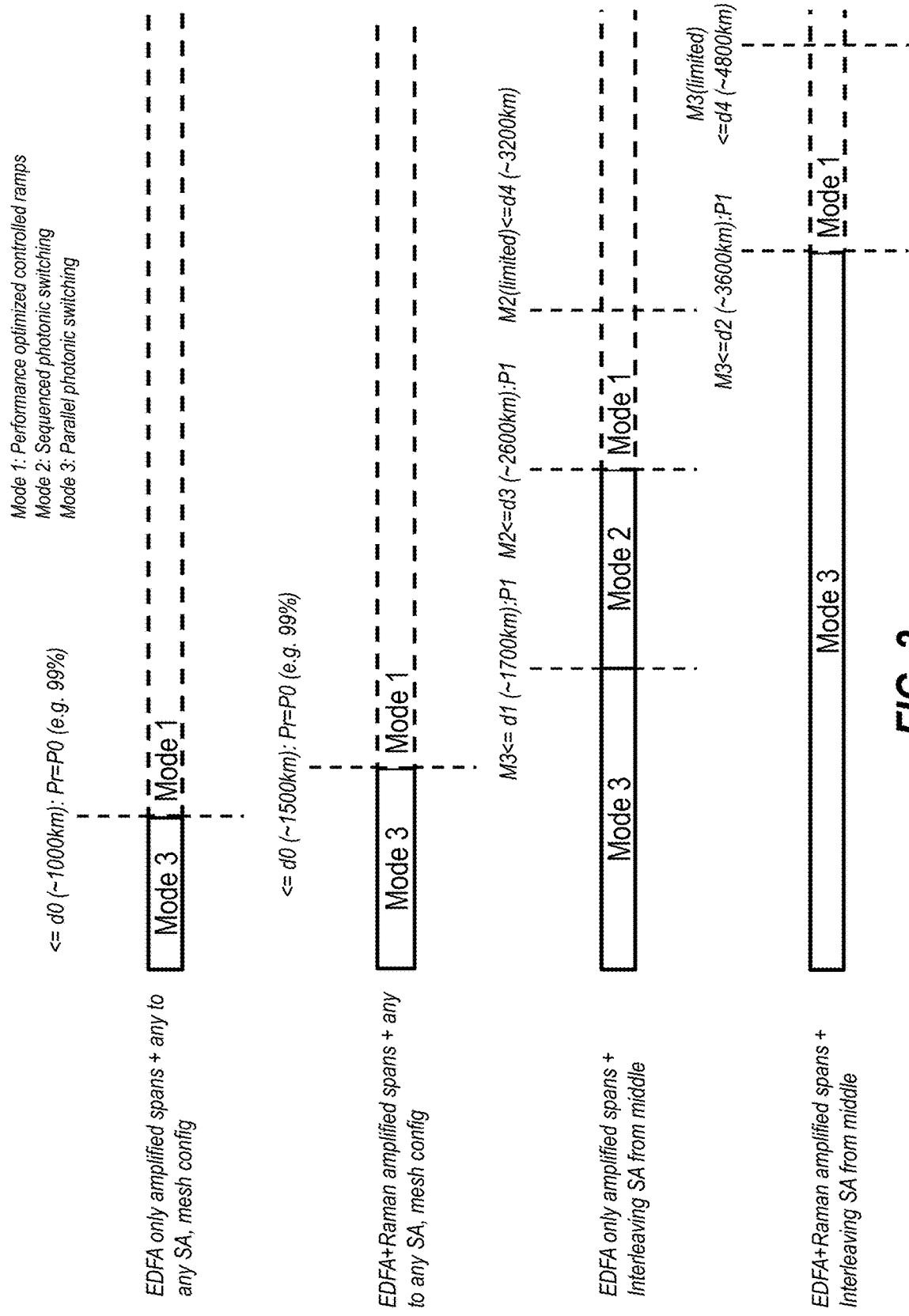
FIG. 3 is a visualization of distance versus mode for various different configurations of the optical network.

Hypothesis (10): All the distance values for $d_0$ to $d_4$ are related to the margin penalty constraint X dB, where X=2 dB, 0.5 dB etc. Larger margin penalty allowance will allow achieving longer reach with faster restoration speeds, and lower margin allowance will allow shorter reach. FIG. 3 is a visualization of distance versus mode for various different configurations of the optical network. The numerical distance values are presented based on simulation from a 40× span linear network as shown in FIG. 1 based on a given EDFA and Raman amplifier type, and considering typical insertion losses for the components, and typical fiber losses for NDSF fiber spans. It should be understood that if the fiber type is changed, or the EDFA type and its noise figure (NF) characteristics are made different, or if the pump ratios or pump powers for the Raman amplifiers are calibrated differently, then the simulation outcome will be different, and the numerical distance values presented in FIG. 3 will change accordingly.

Hypothesis (11): all distance values for $d_0$ to $d_4$ and their X dB margin penalty are also associated with a probabilistic number, Pr. The value Pr indicates the probability of getting a margin hit >X dB for a given restoration speed and achievable distance. Pr can be different if a specific spectrum assignment scheme is followed (such as described in Hypothesis (1)) versus any other assignment scheme.

Hypothesis (12): Placement of Raman amplifiers for every span (≥~80 km) helps to keep the spectral profile sustaining Stimulated Raman Scattering (SRS) tilt at high spectral fill conditions when channels are restored in interleaving spectral assignment format following hypothesis (1)-(4).

Hypothesis (13): for metro networks (e.g. ≤1000 km with no optical section >3× spans), Mode 3 can be preferred for adding over the metro networks since it provides same or better SNR margin penalty for pre-existing channels compared to Mode 2 and provides better restoration timing. For long-haul networks, (e.g. with one or more optical sections >3× spans or >1000 km), Mode 2 can be preferred for adding over EDFA amplified paths since it generates less link budget penalty compared to Mode 3. However, if the spans are Raman amplified, then Mode 3 provides better SNR margin penalty compared to Mode 2.

Assumptions

In this disclosure, it is assumed, for the optical network, there is a given total demand set, i.e., A-Z channels. In an embodiment, the set of total demands is for a greenfield network where an initial set of demands is being placed and the systems and methods provide an approach for demand and restoration speed planning. In another embodiment, the heuristics can also apply to a brownfield network (existing network with already in-service channels).

Path viability is assumed for paths, i.e., optical reach is sufficient. There are user preferences or policies as a given (or as a default). All demands to be assigned use a similar signal baud rate. Demands to be assigned in fixed spectral slots such as 37.5 GHz, 50 GHz, 75 GHz, 100 GHz, 150 GHz, or even can be in 500 GHz spectral slots. All photonic services will have at least X dB of additional SNR margin on their home route to start with to survive fast restoration activity on that path.

User-Defined Policies

The user-defined policies are from the network operator/service provider. These can be set in the controller 20 and influence operation of the systems and methods. The policies can be assigned in general for all routes and all demand assignments or can be done against specific routes or demands.

A first policy includes a preference for in-service traffic integrity versus time-constrained restoration. If in-service traffic integrity is set to maximum, then the selected restoration speed has to maintain the available EOL SNR margin for all existing in-service channels. An opposite selection will allow a mode that can achieve the restoration speed even if that means some of the existing in-service channels on the path can be momentarily down for few seconds to minutes due to transient offsets until control operations come along following restoration completion, and mops up the power offset to bring back traffic. A default could be to prioritize in-service traffic integrity over the time-constrain. The in-service traffic integrity can be tied up with a probabilistic number Pr such as a default of $10^{-5}$.

A second policy can include a preference between regeneration and time-constrained restoration. If a regenerator (Optical-Electrical-Optical) is placed in the middle, the restoration time is split between two regen segments (optical sections), although regenerators may have cost implications. A default would be to suggest a regenerator if time-constraint cannot be met for long-links.

A third policy can include a preference for best-effort versus relaxed time-constrained restoration. If for any route, the time constraint cannot be met, should the algorithm continue to assign modes to achieve restoration in the best effort as fast as possible, or should it fall back to the default performance optimized restoration speed settings? The default would be to fall back on performance-optimized restoration speed settings.

Demand and Route Classification, and Restoration Mode (Speed) Assignment

Figure 4:
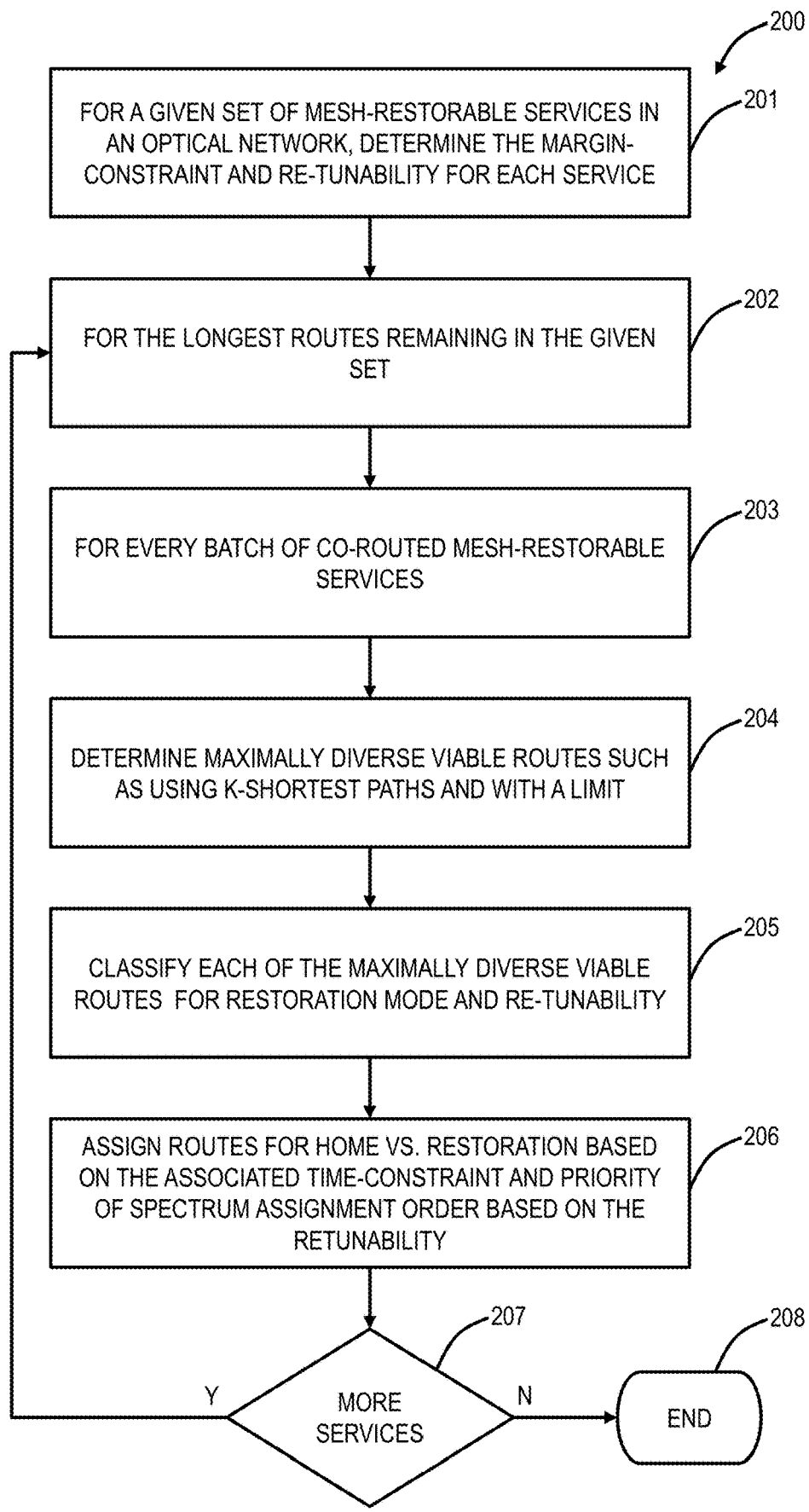
FIG. 4 is a flowchart of a process for demand and route classification, and restoration mode (speed assignment)

FIG. 4 is a flowchart of a process 200 for demand and route classification, and restoration mode (speed assignment). The process 200 is one example of a technique utilizing the previous hypothesis to assign mesh-restorable services spectrum and routes to ensure a time-constraint and a margin-constraint are met when restoring to a restoration path. For a given set of mesh-restorable services in the optical network 10, 100, the process 200 includes determining the margin-constraint and re-tunability for each service (step 201). Here, the margin constraint means does the service have a restoration path with enough margin that can use faster restoration speeds such as mode 2 or mode 3. The re-tunability means, can the service maintain the condition $T \geq (T_p + T_R)$? If yes, they can be re-tuned on restoration if necessary.

Next, the process 200 includes, for the longest routes remaining in the given set (step 202) and for every batch of co-routed mesh-restorable services (same source and destination) (step 203), determining maximally diverse routes in the optical network 10, 100 such as using K-shortest paths and with a limit such as up to 5× (step 204). Note, there can be multiple rails (parallel fiber routes) between source and destination pair in the optical network 10, 100, and, in such case, each rail can be considered as a diverse route with no fiber path overlap between them.

The process 200 includes classifying each of the maximally diverse viable routes for restoration mode and re-tunability for the corresponding batch of co-routed mesh-restorable services (step 205). This step utilizes the hypothesis (5)-(8) (i.e., primarily based on distance and Raman amplification capability to determine the restoration mode of the controller. This step further utilizes the re-tunability already determined above.

The process 200 assigns routes for home versus restoration based on the associated time-constraint T and the priority of spectrum assignment order based on re-tunability (step 206). The process 200 checks if there are more services to assign (step 207), and, if so, returns to step 202, and, if not, ends (step 208). For example, the process 200 can provide data such as this example table:

| Demand | Viable Route List | Restoration Mode | Re-tune Capable (Y/N) | Route assignment | Priority in Spectrum Assignment |
|---|---|---|---|---|---|
| Demand 1 | Route 1 | Mode 3 | Y | Restoration 1 | Low |
|  | Route 2 | Mode 3 | Y | Restoration 2 |  |
|  | Route 3 | Mode 2 | N | Home/Restoration |  |
|  | Route 4 | Mode 2 | N | Home/Restoration |  |
|  | Route 5 | Mode 1 | Y | Home/Restoration |  |
| Demand 2 | Route 6 | Mode 2 | N | Home/Restoration | High |
|  | Route 7 | Mode 2 | N | Home/Restoration |  |
| ... | ... | ... | ... | ... | ... |

Routing and Spectrum Assignment

Figure 5:
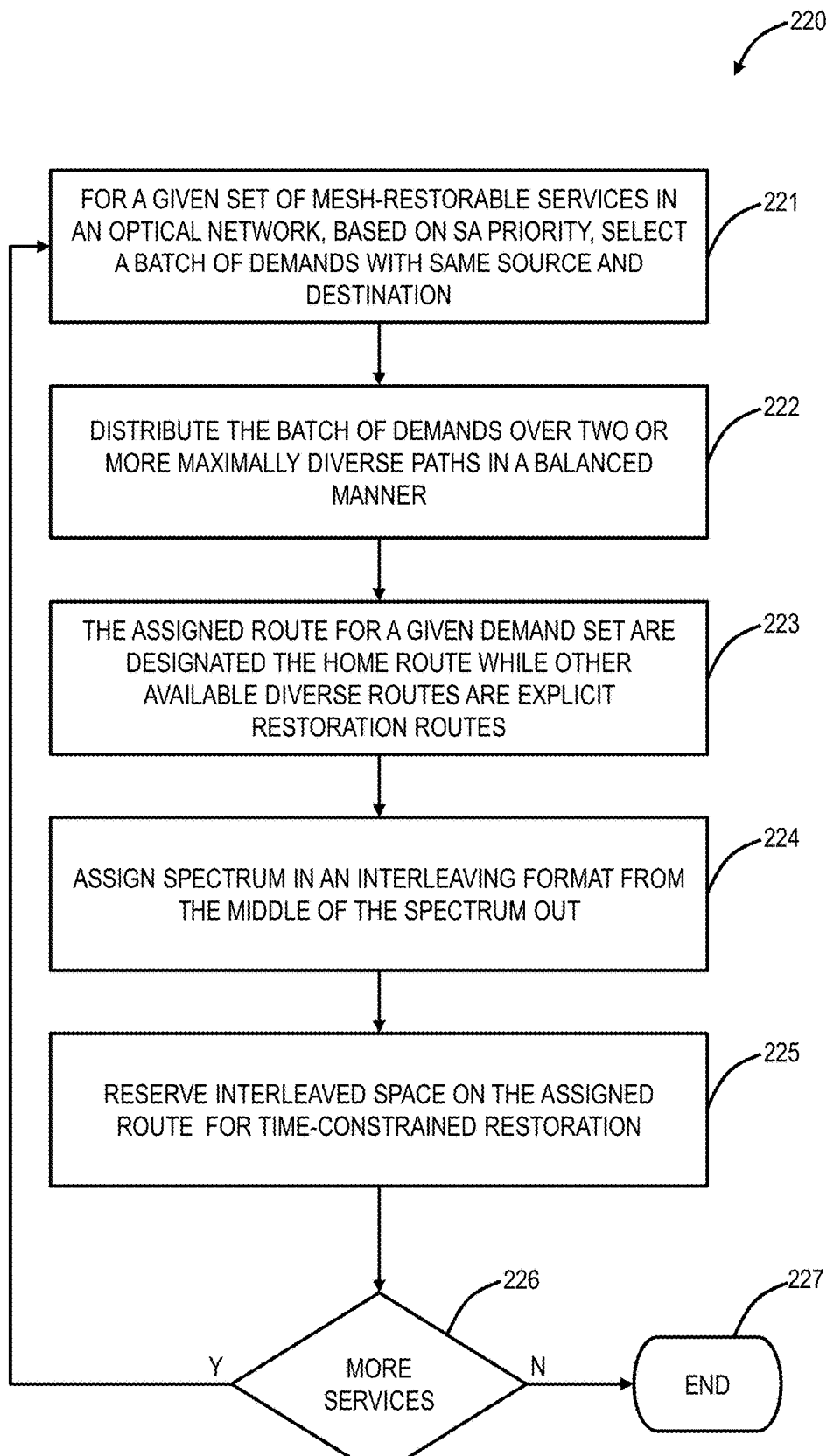
FIG. 5 is a flowchart of a process for Routing and Spectrum Assignment based on the time- and margin-constraints.

FIG. 5 is a flowchart of a process 220 for Routing and Spectrum Assignment based on the time- and margin-constraints. The process 220 is another example of a technique utilizing the previous hypothesis to assign mesh-restorable services spectrum and routes to ensure a time-constraint and a margin-constraint are met when restoring to a restoration path. Various aspects of the processes 200, 220 contemplate operation together or independently.

The process 220 includes, for a given set of mesh-restorable services in an optical network, based on Spectrum Assignment (SA) priority, selecting a batch of demands with the same source and destination in the optical network 10, 100 (step 221). The selection of the batch of demands can be based on those tagged "high" for priority in the spectral assignment. The process 220 includes distributing the batch of demands over two or more maximally diverse paths in a balanced manner (step 22). For example, the balanced manner can include, if there are 2× paths, assigning about 50% demand on one route and the rest on other; if there are 3× routes, assigning about 33% on each route, etc.

The assigned route for a given demand set becomes the home route, while the other available diverse routes become the explicit restoration routes (step 223). The process 220 includes assigning spectrum in an interleaving format from the middle of the spectrum out (step 224). This is based on Hypothesis (1). In an embodiment, if one route of the two or more maximally diverse paths is assigned "even" spectral slots, the other route is assigned "odd" spectral routes, etc. The terms "even" and "odd" are relative and used to signify the offset of an interleaving pattern. For example, even spectrum combined with odd spectrum can cover the entire spectrum. For a plurality of diverse routes with distributed demands, the interleaving space may need to be increased.

For a given route (same end-to-end set of fiber spans), all co-routed channels can be assigned either one at a time in interleaving fashion or in a small chunk of contiguous spectrum (~≤500 GHz). The process 220 includes reserving interleave space on assigned routes for time-constrained restoration (step 225). In this case, interleaving space for which spectrum is assigned in other paired routes will need to be reserved to meet the time-constrained restoration. The process 220 checks if there are more services to assign (step 226), and, if so, returns to step 222, and, if not, ends (step 227). For example, once all "high" priority demands are assigned, the process 220 can include assigning all other demands tagged as "low" in priority of assignment.

If there is a route for which the restoration constraints cannot be met, this can be selected as the home route. This is new and different from traditional home route selection using K-shortest paths. The idea is to secure at least one restoration route first that can meet the constraints and then the home route can be selected from the rest of the viable routes (it does not have to be the longest one all the times).

For non-mesh-restorable services, the process 220 can treat them same as other "Low" tagged mesh-restorable demands after all mesh-restorable demands are assigned. If after channel placement, it appears that specific channels do not have the required X=2 dB margin, then the process 220 can either reduce the capacity to get additional margin or re-do the demand classification assessment considering the route is not capable of running faster restoration speed (mode 2 or mode 3).

Further optimization algorithm or heuristics can be applied on top of the process 220 to optimize the RSA for a given network and demand sets. For example, if the demand set is too large to follow the proposed RSA process 220 which ones to prioritize to assign them first. If a spectral slot is left reserved for protection for the case, where $T<(T_P+T_R)$, but $T>T_P$, can that slot be reserved for 1:N protection instead of 1+1, and so on. If for a given route, it appears that channel placement is concentrated near the high or low-frequency edge, the process 220 can run further optimization to re-route them to a different spectral slots more concentrated in the center or spread across the band.

Figure 6:
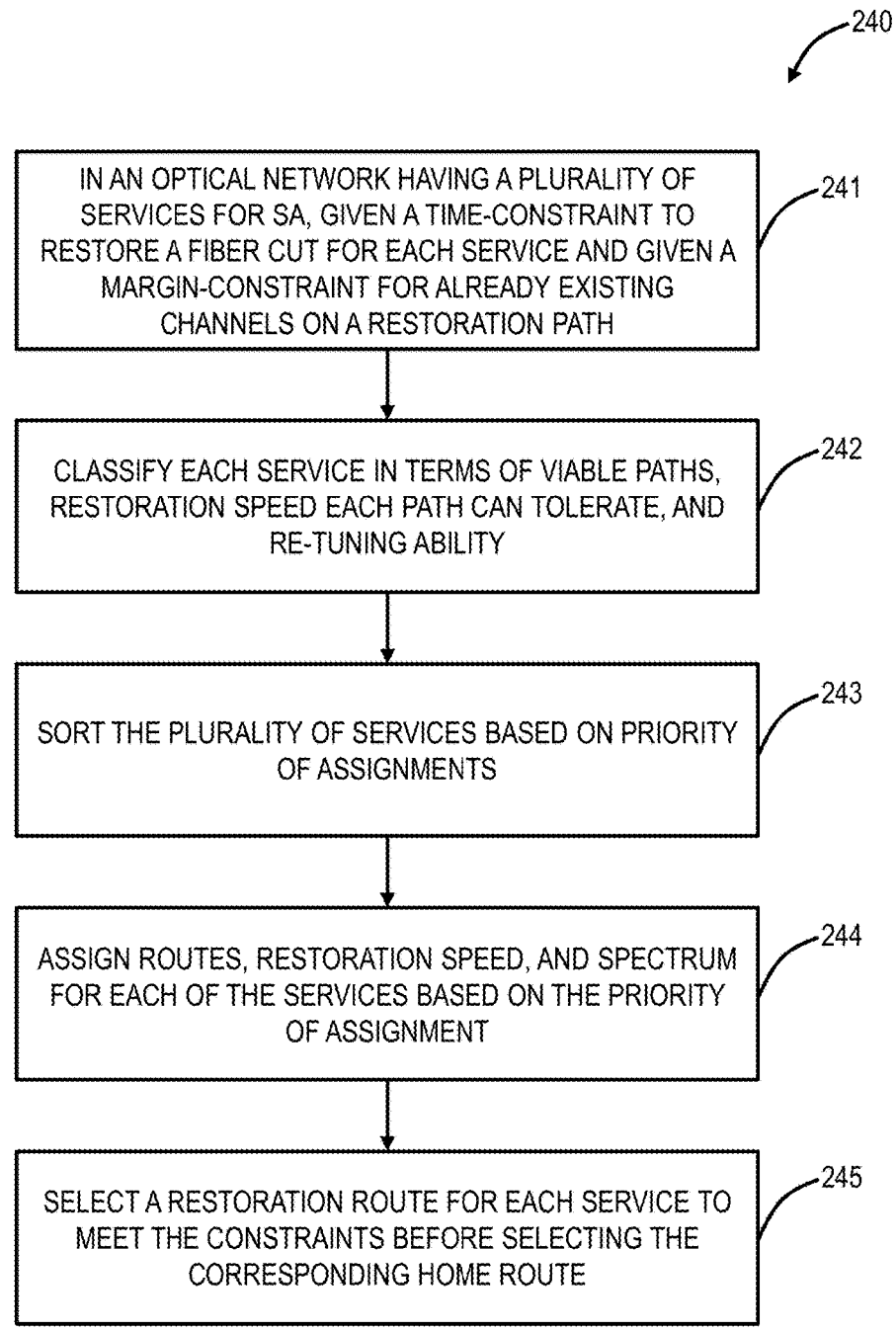
FIG. 6 is a flowchart of a process for assigning route, spectrum, and restoration speed for both home path and restoration.

Process to Assigns Route, Spectrum, and Restoration Speed for Both Home Path and Restoration FIG. 6 is a flowchart of a process 240 for assigning route, spectrum, and restoration speed for both home path and restoration. The process 240 is another example of a technique utilizing the previous hypothesis to assign mesh-restorable services spectrum and routes to ensure a time-constraint and a margin-constraint are met when restoring to a restoration path. Various aspects of the processes 200, 220, 240 contemplate operation together or independently.

The process 240 is performed in the optical network 10, 100 having a plurality of services that require Spectrum Assignment (SA) with some or all services having a given time-constraint T to restore from a fiber cut or other failure and a given margin-constraint X dB for already existing channels on a corresponding restoration path (step 241). That is, the process 240 assigns route, spectrum, and restoration speed for both home path and restoration, considering a time-constraint to complete the restoration on a fiber cut on the home route and considering a margin penalty-constrain for already existing channels on the restoration path to survive transients due to restoration activity.

The process 240 includes classifying each service in terms of viable paths, restoration speed each of the viable paths can tolerate, and re-tuning ability (step 242). The viable paths can be determined utilizing K-shortest paths or the like. The restoration speed can be determined utilizing the hypothesis #5-#8. The re-tuning ability includes can the service maintain the condition $T\geq(T_p+T_R)$? The process 240 includes sorting the plurality of services based on the priority of assignments (step 243).

The process 240 includes assigning routes, restoration speed, and spectrum for each of the services based on the priority of assignment (step 244). This can be based on following hypothesis #1-#4. For example, the services can be assigned fixed spectral slots in an interleaving format, where each slot defines a continuous part of the spectrum to accommodate one or more co-propagating channels.

The process 240 can include selecting restoration routes for each service first to meet the constraints before selecting the corresponding home route (step 245). The process 240 can include always re-tuning on restoration and selecting a first available spectral slot at the middle part of the spectrum if the condition $(T_P+T_R)\leq T$ can be met using a restoration mode, or if the time-constraint cannot be met such that $T_p>T$, where $T_P$=photonic switching time, $T_R$=modem retune time, and T is the given time-constraint to complete the restoration.

The process 240 can include reserving a spectral slot on the restoration path and not re-tuning at restoration if the condition $(T_p+T_R)\leq T$ cannot be met using a restoration mode, where $T_p\leq T$. The process 240 can include performing route and demand classification using hypothesis #5-#8, where the reach values $d_0$-$d_3$ are directly proportional to the margin penalty constraint X dB. The process 240 can include reducing capacity for a given photonic service if the service fails to have X dB additional SNR margin on its home route to survive fast restoration activity. The process 240 can include determining customer-defined policies for time-constrained restoration versus regenerators or in-service traffic integrity.

Controller

Figure 7:
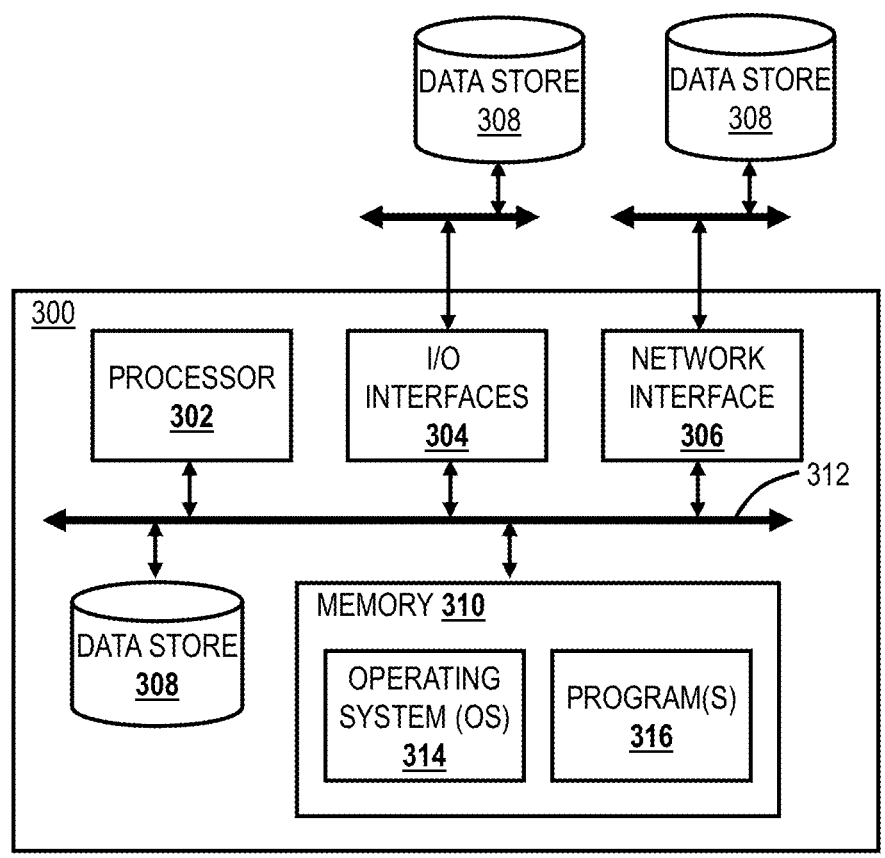
FIG. 7 is a block diagram of a controller for the optical network of FIGS. 1-2.

FIG. 7 is a block diagram of a controller 20 for the optical network 10, 100. The controller 20 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 7 depicts the controller 20 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the controller 20, a semiconductor-based microprocessor (in the form of a microchip or chip set), or generally any device for executing software instructions. When the controller 20 is in operation, the processor 302 is configured to execute software stored within the memory 310, to communicate data to and from the memory 310, and to generally control operations of the controller 20 pursuant to the software instructions. The I/O interfaces 304 may be used to receive user input from and/or for providing system output to one or more devices or components.

The network interface 306 may be used to enable the controller 20 to communicate over a network, such as to the optical network 10, to other OADM nodes 12, optical line amplifiers, etc. The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the controller 20 such as, for example, an internal hard drive connected to the local interface 312 in the controller 20. Additionally, in another embodiment, the data store 308 may be located external to the controller 20 such as, for example, an external hard drive connected to the I/O interfaces 304 (e.g., SCSI or USB connection). In a further embodiment, the data store 308 may be connected to the controller 20 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Simulations

FIG. 1 was utilized to perform various simulations with 40× spans: 5× spans/optical section. There are three configurations—Config(1): 80 km per span; NDSF; EDFA only per span; Config(2): 80 km per span; NDSF; EDFA+Raman per span; and Config(3): 120 km per span; NDSF; EDFA+Raman amplification per span. There are 88-96× Channels in 50 GHz spectrum with 35GBaud signals; 64× Channels in 75 GHz spectrum with 56GBaud signals. The fiber links are simulated using a Gaussian Noise (GN) model. The performance is monitored in terms of SNR penalties at the start and end of each 5× spans optical section. Mx number of channels in-service to start with and these are called Probe channels. N×number of channels are added on top using fast restoration modes such as mode 2 and mode 3. SNR margin penalty is simulated (that contains both linear and non-linear penalties) considering the delta of transient state following a capacity change using mode 2 or mode 3 and the final optimized state. It should be appreciated that if the span loss, fiber type, or fiber characteristics (such as loss per distance) are changed, or the EDFA type and it's gain range, noise figure (NF) characteristics are made different, or if the pump ratios or pump powers for the Raman amplifiers are calibrated differently, then the simulation outcome will be different, and the absolute numerical distance values, and simulation graphs presented in figures will change accordingly.

FIGS. 8-12 are graphs of various simulations. Each of FIGS. 8-12 include a top graph illustrating the worst-case SNR margin penalty impact on any pre-existing M× in-service channels by restoring/adding N×number of channels by using the mode 3 (M3), and a bottom graph illustrating the worst case SNR impact using the mode 2 (M2).

Figure 8:
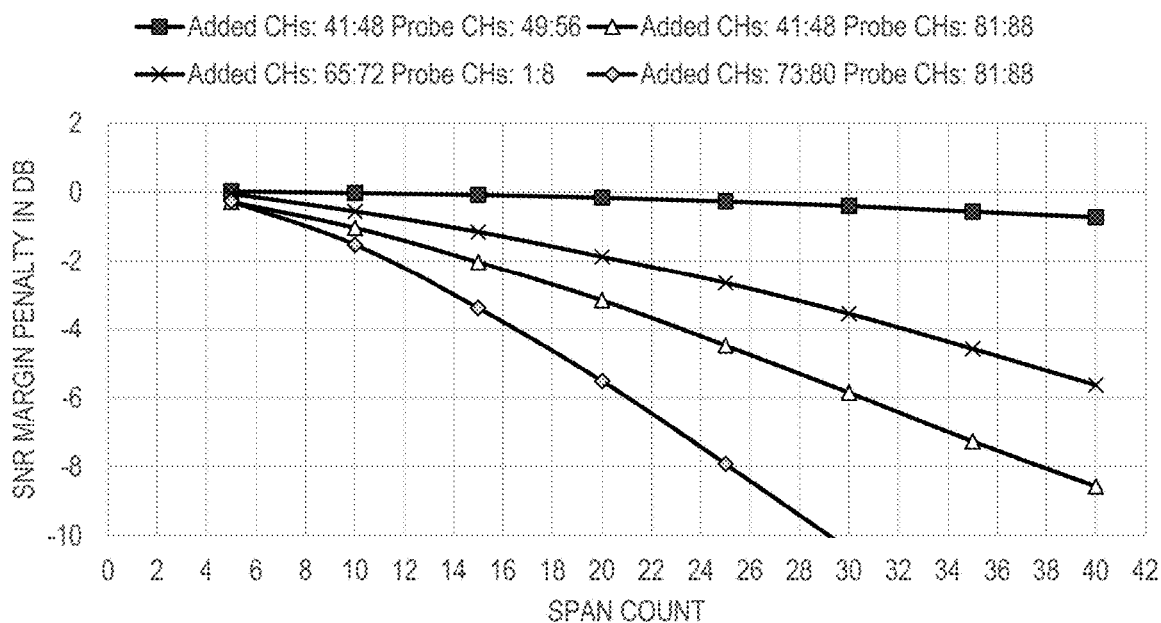
FIG. 8 is graphs of SNR margin penalty versus span count for adding 8× new channels on a route of 40× spans with 80 km/span and EDFA-only and the route having 8× probe channels existing in-service.
Figure 8:
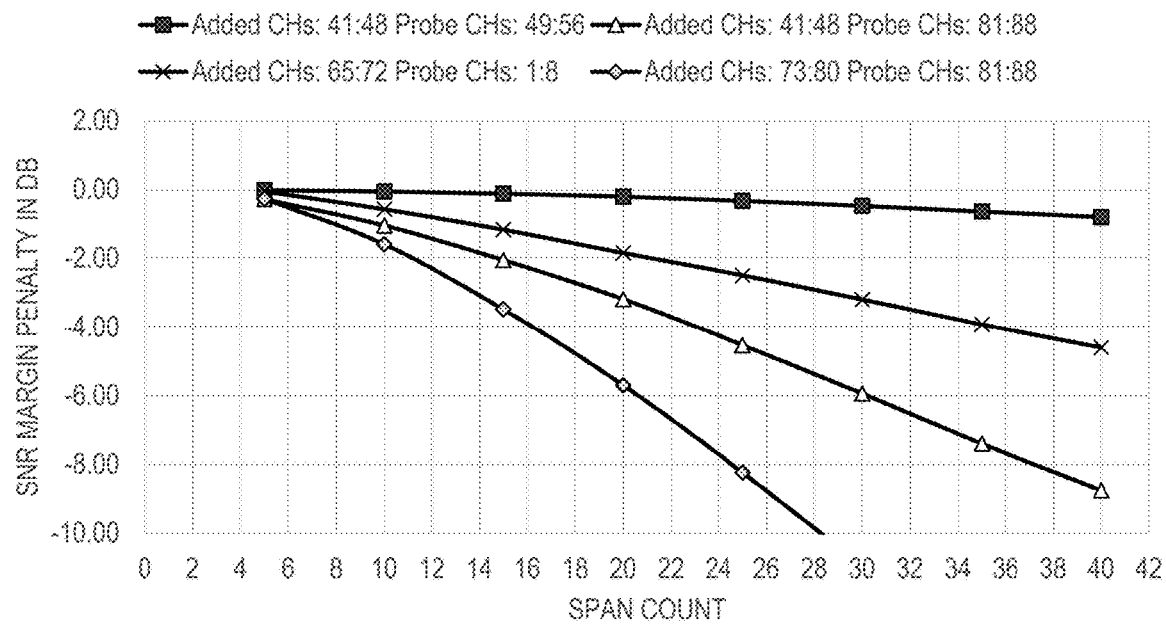

FIG. 8 is graphs of worst-case SNR margin penalty versus span count for adding 8× new channels on a route of 40× spans with 80 km/span and EDFA-only and the route having 8× probe channels existing in-service. This is one of the worst case channel loading conditions for adding new channels. That proves, if the span count is ≤~11×spans=900 km for the EDFA only case, then any to any channel can be added or restored using Mode 3, and the additional SNR margin penalty will still be ≤2 dB.

Figure 9:
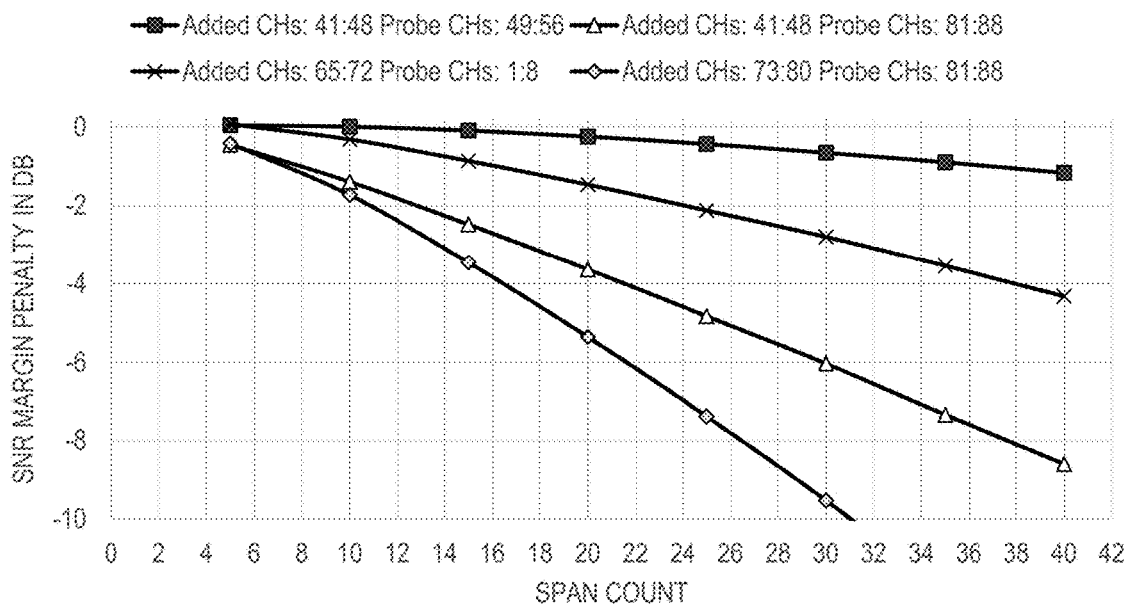
FIG. 9 is graphs of SNR margin penalty versus span count for adding 8× new channels on a route of 40× spans with 120 km/span and EDFA and Raman and the route having 8× probe channels existing in-service.
Figure 9:
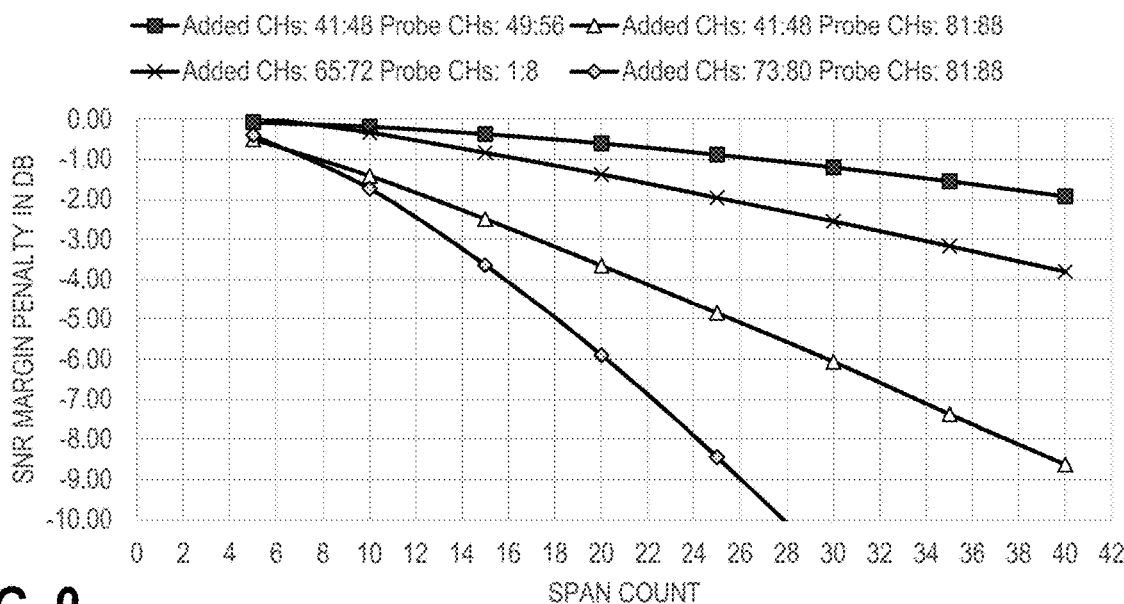

FIG. 9 is graphs of SNR margin penalty versus span count for adding 8× new channels on a route of 40× spans with 120 km/span and EDFA and Raman and the route having 8× probe channels existing in-service. For the 8 by 8 scan, it shows if in-service and add channels are placed in the middle side by side, then up to 40× spans, the margin penalty is less than 2 dB. But as they are further apart or placed close to each other at the spectral hole region (at the high-frequency end), then there is large SNR penalty at 40× spans, and those scenarios are primarily limiting the reach of using mode 3 up to 11× spans (~1300 km) to keep penalty ≤2 dB.

Figure 10:
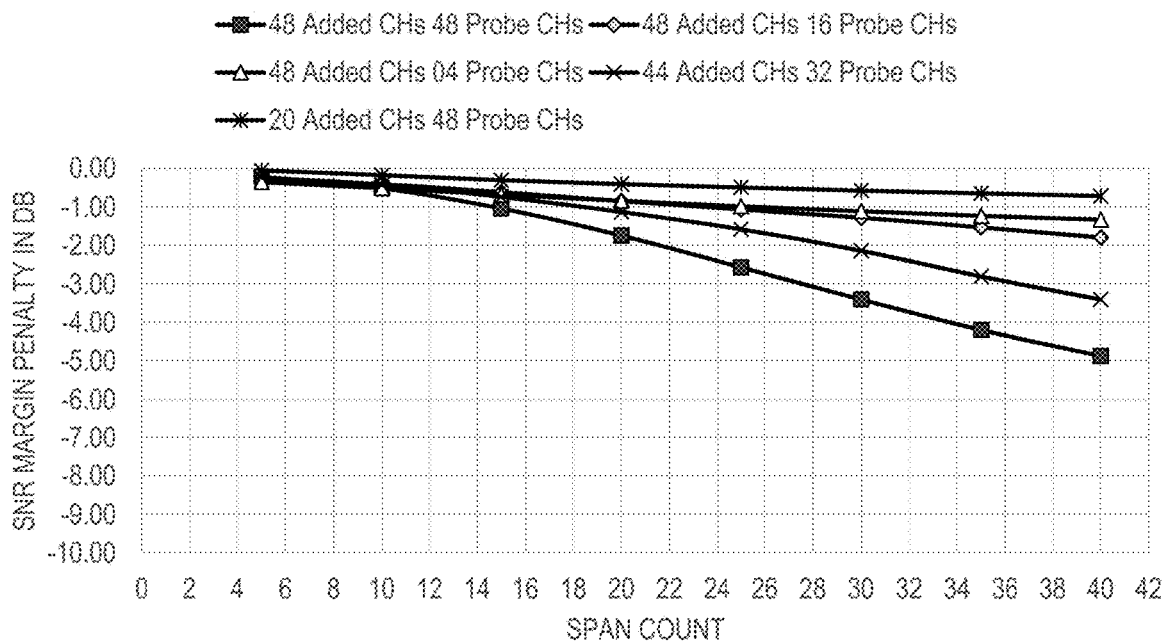
FIG. 10 is graphs of SNR margin penalty versus span count for adding N× new channels on a route of 40× spans with 80 km/span and EDFA-only and the route having M× probe channels existing in-service in an interleaving format.
Figure 10:
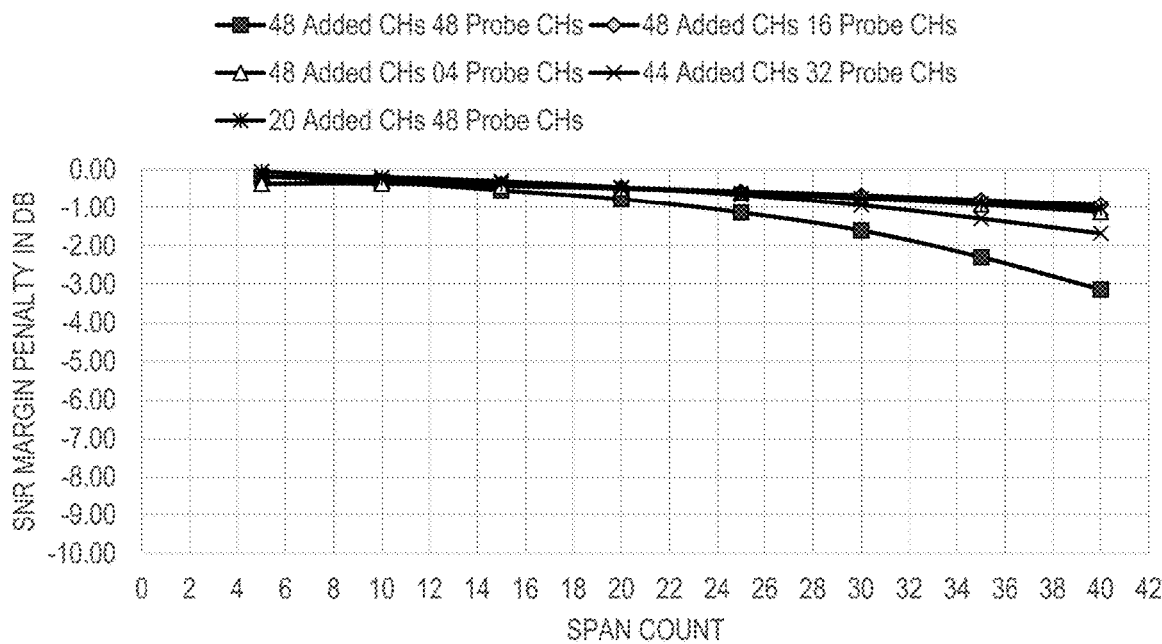

FIG. 10 is graphs of SNR margin penalty versus span count for adding N× new channels on a route of 40× spans with 80 km/span and EDFA-only and the route having M× probe channels existing in-service in an interleaving format. With Mode 3 and interleaving Spectrum Assignment starting from the middle, 2 dB margin penalty constraint can be maintained up to 22× EDFA only amplified spans ≤~1700 km. If channel assignment starts from the middle, then the load ratio between probe channels (already existing on the path) and added channels (that are getting newly added) does not make a big impact With Mode 2 and interleaving Spectrum Assignment starting from the middle, 2 dB margin penalty constraint can be maintained up to 33×EDFA only amplified spans ≤~2600 km. If channel assignment starts from the middle, then the load ratio between probe channels (already existing on the path) and added channels (that are getting newly added) does not make a big impact.

Figure 11:
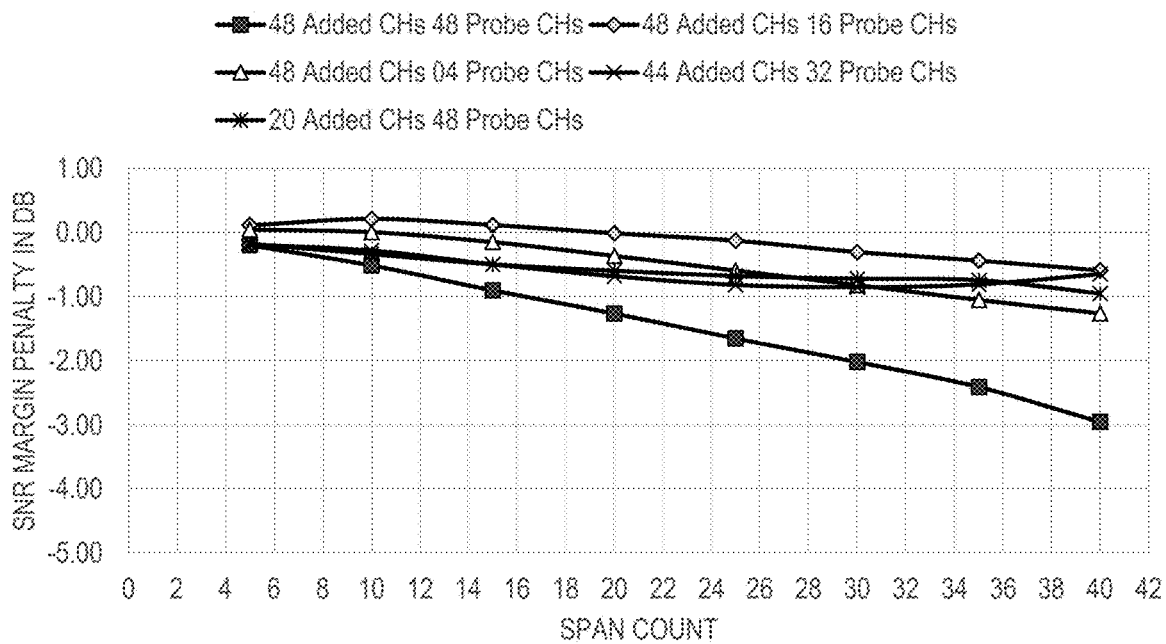
FIG. 11 is graphs of SNR margin penalty versus span count for adding N× new channels on a route of 40× spans with 120 km/span and EDFA and Raman and the route having M× probe channels existing in-service in an interleaving format.
Figure 11:
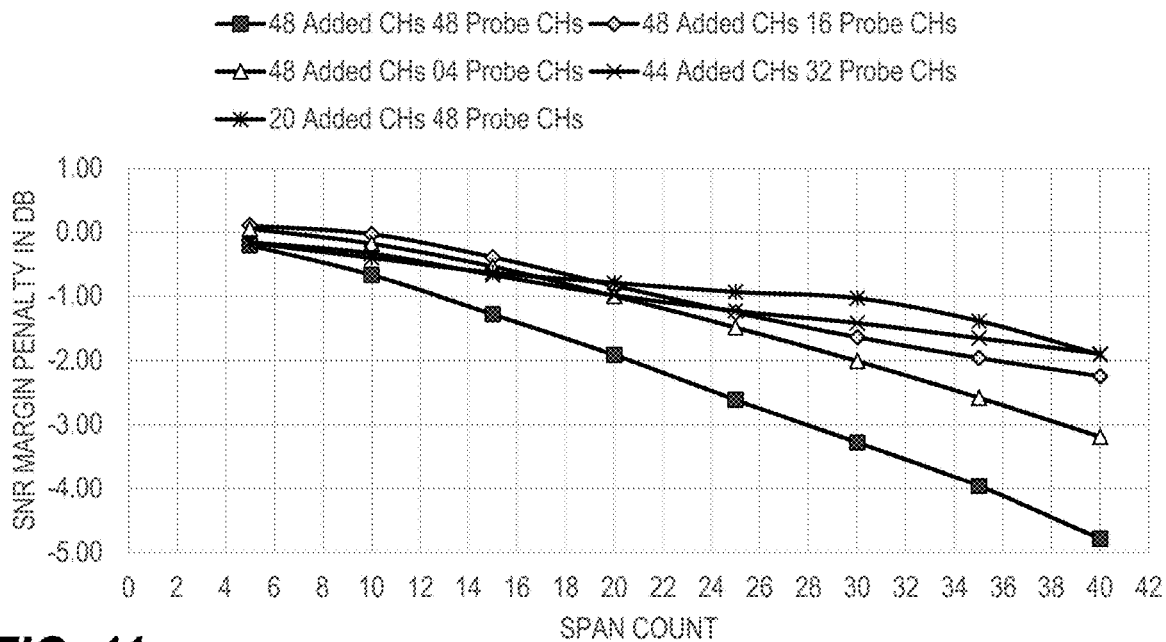

FIG. 11 is graphs of SNR margin penalty versus span count for adding N× new channels on a route of 40× spans with 120 km/span and EDFA and Raman and the route having M× probe channels existing in-service in an interleaving format. With Mode 3 and interleaving Spectrum Assignment starting from the middle, 2 dB margin penalty constraint can be maintained up to 30× EDFA and Raman amplified spans ≤~3600 km. If channel assignment starts from the middle, then the load ratio between probe channels (already existing on the path) and added channels (that are getting newly added) does not make a big impact.

As evident from FIGS. 10-11, if the spans are EDFA only amplified, then Mode 2 is preferred for restoration since it generates less link budget penalty compared to Mode 3. However, if the spans are Raman amplified along with EDFAs, then Mode 3 provides better SNR margin penalty compared to Mode 2 due to gain compression from Raman amplifiers. Raman gain compression is a phenomenon where if total power increases to the fiber span, then Raman gain drops, and existing channels undershoot, and if the total power drops to the span, then Raman gain increases, and existing channels overshoot. With Mode 3 add, where channel actuators are pre-estimated and set parallelly in all WSSs before the add starts, the adding channels suffer similar physical perturbation (in this case undershoots in specific spectral locations) as the pre-existing channels due to Raman gain compression across all the spans without any further per channel actuator adjustment. As the add channels progress more and more spans, the power of adding channels drop, and hence causes less gain compression and less penalty for pre-existing channels. With Mode 2 add, local controller re-adjusts channel powers in every OADM mux to re-achieve their launch power target at the start of the section even if the power drops in the previous section due to gain compression, SRS tilt or ripple. That means, with Mode 2, more power is added per section compared to Mode 3, and this causes more gain compression undershoots for pre-existing channels in some specific spectral locations.

Figure 12:
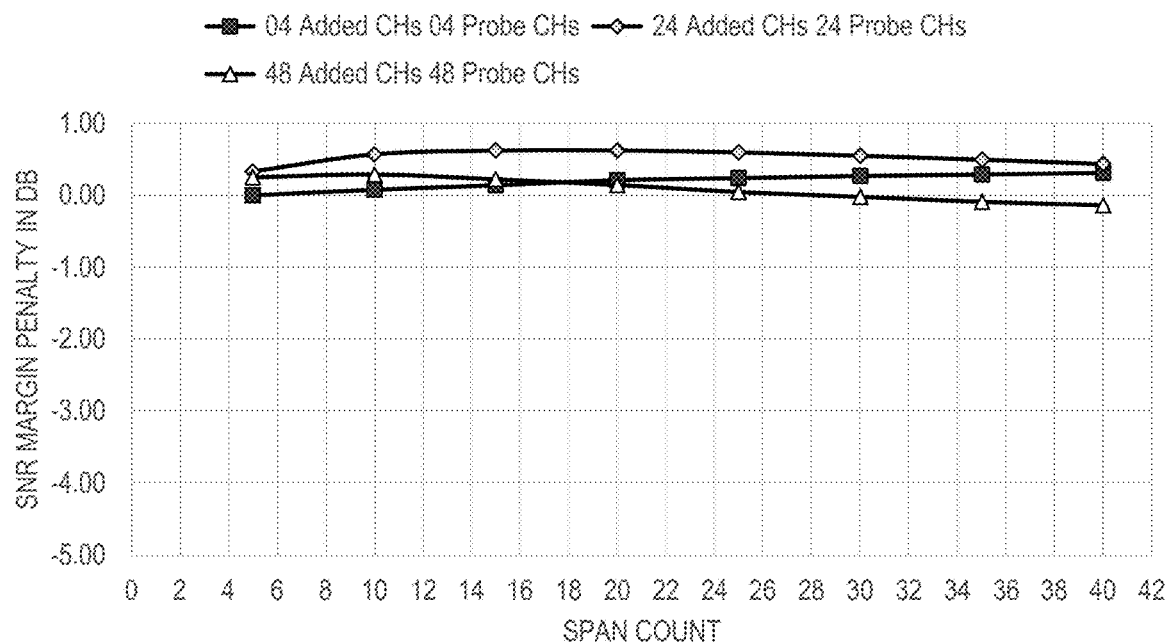
FIG. 12 is graphs of SNR margin penalty versus span count for adding N× new channels on a route of 40× spans with 80 km/span and EDFA and Raman and the route having M× probe channels existing in-service in an interleaving format.
Figure 12:
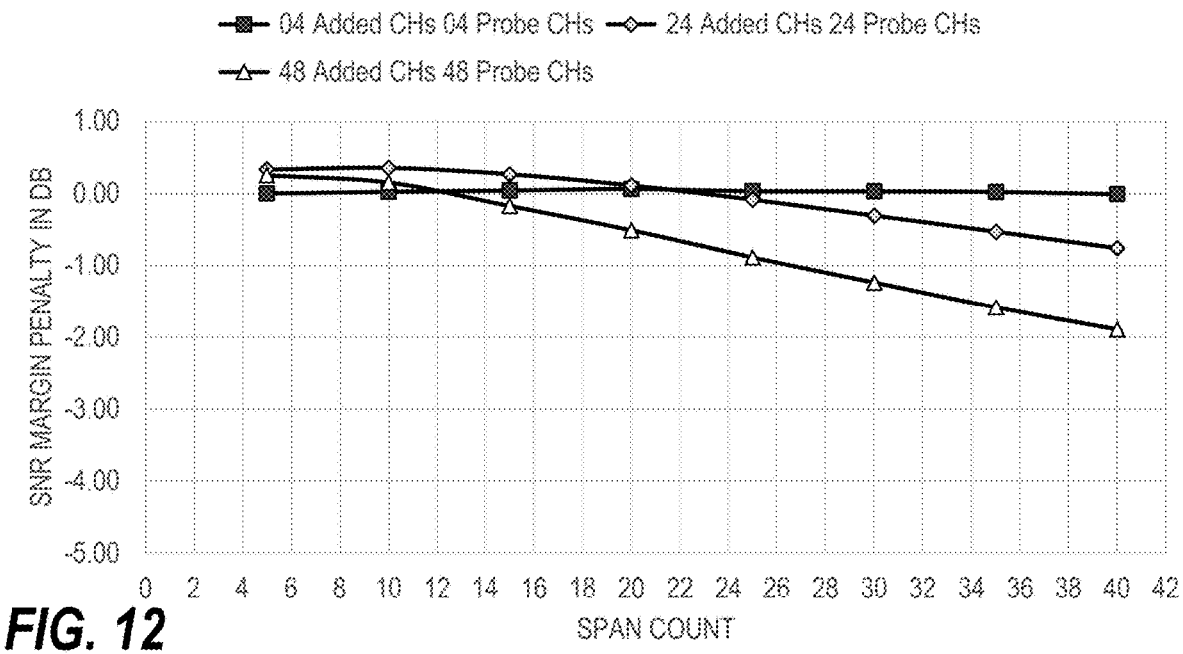

FIG. 12 is graphs of SNR margin penalty versus span count for adding N× new channels on a route of 40× spans with 80 km/span and EDFA and Raman and the route having M× probe channels existing in-service in an interleaving format. With Mode 3 and interleaving Spectrum Assignment starting from the middle, 2 dB margin penalty constraint can be maintained up to 40× EDFA and Raman amplified spans (80 km/Span) ≤~3200 km. If channel assignment starts from the middle, then the load ratio between probe channels (already existing on the path) and added channels (that are getting newly added) does not make a big impact. The simulation data is presented for all spans amplified either only with EDFAs or with EDFA plus Raman in every span. In practical field deployment, it is understood that there will be a mix of configurations, where in a route, some spans will have Raman amplification, where some spans only have EDFAs, and the actual SNR penalty for doing a fast restoration on such route will lie somewhere in between the presented results.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A controller for an optical network comprising:
a network interface configured to communicate to one or more nodes in an optical network that includes a plurality of nodes interconnected by a plurality of links;
a processor communicatively coupled to the network interface; and
memory storing instructions that, when executed, cause the processor to
obtain information related to a plurality of services that require spectrum assignment with each service given a time-constraint T for restoration to a restoration path and each service on its home route given a margin-constraint X dB to tolerate transients caused by restoring channels,
classify each of the plurality of services in terms of viable paths in the optical network, restoration speed each viable path can tolerate, and re-tunability,
assign a home route and a restoration route, a restoration speed, and spectrum for each of the plurality of services based on priority, and
assign the restoration route for a service to meet the time-constraint T and the margin-constraint X dB before selecting the home route.

2. The controller of claim 1, wherein the restoration speed is determined based on a combination of distance of a restoration path, restoration mode achievable by the controller based on the margin-constraint X dB of any existing in-service channels on the restoration path, and amplifier types on the restoration path.

3. The controller of claim 1, wherein the assigned spectrum utilizes an interleaving format where initial placement is on a middle portion of optical spectrum outward.

4. The controller of claim 3, wherein a service is configured to re-tune to a reserved portion of the interleaving format on the restoration route, and wherein the service selects a closest reserved portion to the middle portion.

5. The controller of claim 1, wherein the re-tunability includes whether a node associated with a service can achieve the time-constraint $T \geq T_P + T_R$ where $T_P$=photonic switching time, and $T_R$=modem retune time.

6. The controller of claim 1, wherein a set of services of the plurality of services have the same source and destination in the optical network, wherein there are two or more maximally diverse paths between the source and destination, and wherein the set of services are assigned in a balanced manner between the two or more maximally diverse paths.

7. The controller of claim 6, wherein the two or more maximally diverse paths are assigned spectrum in an interleaved manner such that one path has even interleaving, and another path has odd interleaving, each having reserved slots that are used for restoration from the other path.

8. The controller of claim 1, wherein the memory storing instructions that, when executed, further cause the processor to
obtain customer-defined policies for the time-constraint T for restoration relative to regeneration or existing in-service traffic integrity, and
utilize the customer-defined policies for classification and assignment.

9. A controller for an optical network comprising:
a network interface configured to communicate to one or more nodes in an optical network that includes a plurality of nodes interconnected by a plurality of links;
a processor communicatively coupled to the network interface; and
memory storing instructions that, when executed, cause the processor to
obtain information related to a plurality of services that require spectrum assignment with each service given a time-constraint T for restoration to a restoration path and each service on its home route given a margin-constraint X dB to tolerate transients caused by restoring channels,
classify each of the plurality of services in terms of viable paths in the optical network, restoration speed each viable path can tolerate, and re-tunability, and
assign a home route and a restoration route, a restoration speed, and spectrum for each of the plurality of services based on priority,
wherein the restoration speed is determined based on a combination of distance of a restoration path, restoration mode achievable by the controller based on the margin-constraint X dB of any existing in-service channels on the restoration path, and amplifier types on the restoration path.

10. The controller of claim 9, wherein the assigned spectrum utilizes an interleaving format where initial placement is on a middle portion of optical spectrum outward.

11. The controller of claim 10, wherein a service is configured to re-tune to a reserved portion of the interleaving format on the restoration route, and wherein the service selects a closest reserved portion to the middle portion.

12. The controller of claim 9, wherein the re-tunability includes whether a node associated with a service can achieve the time-constraint $T \geq T_p + T_R$ where $T_p$=photonic switching time, and $T_R$=modem retune time.

13. The controller of claim 9, wherein a set of services of the plurality of services have the same source and destination in the optical network, wherein there are two or more maximally diverse paths between the source and destination, and wherein the set of services are assigned in a balanced manner between the two or more maximally diverse paths.

14. The controller of claim 9, wherein the memory storing instructions that, when executed, further cause the processor to
obtain customer-defined policies for the time-constraint T for restoration relative to regeneration or existing in-service traffic integrity, and
utilize the customer-defined policies for classification and assignment.

15. A controller for an optical network comprising:
a network interface configured to communicate to one or more nodes in an optical network that includes a plurality of nodes interconnected by a plurality of links;
a processor communicatively coupled to the network interface; and
memory storing instructions that, when executed, cause the processor to
obtain information related to a plurality of services that require spectrum assignment with each service given a time-constraint T for restoration to a restoration path and each service on its home route given a margin-constraint X dB to tolerate transients caused by restoring channels,
classify each of the plurality of services in terms of viable paths in the optical network, restoration speed each viable path can tolerate, and re-tunability, and
assign a home route and a restoration route, a restoration speed, and spectrum for each of the plurality of services based on priority,
wherein the assigned spectrum utilizes an interleaving format where initial placement is on a middle portion of optical spectrum outward, and wherein a service is configured to re-tune to a reserved portion of the interleaving format on the restoration route, and wherein the service selects a closest reserved portion to the middle portion.

16. The controller of claim 15, wherein the memory storing instructions that, when executed, further cause the processor to
assign the restoration route for a service to meet the time-constraint T and the margin-constraint X dB before selecting the home route.

17. The controller of claim 15, wherein the restoration speed is determined based on a combination of distance of a restoration path, restoration mode achievable by the controller based on the margin-constraint X dB of any existing in-service channels on the restoration path, and amplifier types on the restoration path.

18. The controller of claim 15, wherein the re-tunability includes whether a node associated with a service can achieve the time-constraint $T \geq T_p + T_R$ where $T_p$=photonic switching time, and $T_R$=modem retune time.

19. The controller of claim 15, wherein a set of services of the plurality of services have the same source and destination in the optical network, wherein there are two or more maximally diverse paths between the source and destination, and wherein the set of services are assigned in a balanced manner between the two or more maximally diverse paths.

20. The controller of claim 15, wherein the memory storing instructions that, when executed, further cause the processor to
obtain customer-defined policies for the time-constraint T for restoration relative to regeneration or existing in-service traffic integrity, and
utilize the customer-defined policies for classification and assignment.

* * * * *